United States Patent [19]
Nishizawa

[11] Patent Number: 5,708,888
[45] Date of Patent: Jan. 13, 1998

[54] CAMERA WITH A FRAME SHIFT PREVENTION FUNCTION

[75] Inventor: Akio Nishizawa, Kanagawa-ken, Japan

[73] Assignee: Nikon Corporation, Tokyo, Japan

[21] Appl. No.: 607,140

[22] Filed: Feb. 26, 1996

[30] Foreign Application Priority Data

Feb. 27, 1995 [JP] Japan .................. 7-038542

[51] Int. Cl.$^6$ .................. G03B 17/00; G03B 1/00
[52] U.S. Cl. .................. 396/395; 396/399; 396/440
[58] Field of Search .................. 354/203, 213, 354/217; 396/395, 399, 440

[56] References Cited

U.S. PATENT DOCUMENTS

| | | | |
|---|---|---|---|
| 4,417,793 | 11/1983 | Oyokota et al. | 354/217 |
| 4,914,462 | 4/1990 | Pagano | 354/213 |
| 5,508,771 | 4/1996 | Stephenson, III | 354/213 |
| 5,555,053 | 9/1996 | Stephenson, III | 354/213 |

FOREIGN PATENT DOCUMENTS 63-180839   7/1988   Japan .

*Primary Examiner*—Eddie C. Lee
*Attorney, Agent, or Firm*—Oliff & Berridge

[57] ABSTRACT

A camera that reliably prevents frame shifts of film by inserting a frame shift prevention member into a film perforation is disclosed. The camera with a frame shift prevention function includes a frame shift prevention member that is supported to move toward or away from the perforation of the film. The frame shift prevention member includes a first oblique plane that makes contact with the edge of the perforation during feeding of the film in the direction of winding in preparation for shooting the next film and a second oblique plane that makes contact with the edge of the perforation during feeding of the film in the direction of reminding that are formed on the frame shift prevention member. The angle between the second oblique angle and the rewinding direction is smaller than the angle between the first oblique angle and the winding direction.

13 Claims, 4 Drawing Sheets

CAMERA WITH A FRAME SHIFT PREVENTION FUNCTION

BACKGROUND OF THE INVENTION

1. Field of the Invention

The present invention relates to a camera with a frame shift prevention function.

2. Background of Related Art

A camera is known in which a sprocket is provided between the cartridge chamber and the spool chamber in which the film perforation is engaged and the film is fed by transmitting the film feeding power from the sprocket to the film. With this the of camera, because the sprocket is inserted in the perforation, frame shifts of the film are not likely to occur even if external vibrations or influences act on the camera. However, in a camera that feeds film by a rotating spool without providing a sprocket or that feeds the film by forwarding the film with the rotation of the cartridge axis, a so-called frame shift in which the film moves from a specified stationary position in the film feeding direction may occur when vibrations and other influences act on a camera.

A camera with a function to prevent such frame shifts is disclosed in Japanese Unexamined Patent Publication Sho 63-180839. Such a camera includes a pressure plate to maintain the flatness of the film by pushing the film from the rear of the camera, a holding spring integrated with the pressure plate as one unit, and a film holding unit that is provided on the tip of the film holding spring and that presses the outside of the film effective plane against a film receiving plate.

In such a camera with a film holding unit, frame shifts of the film are prevented more effectively than in a camera without a film holding unit when external vibrations or other influences act on the camera. However, only the outside of the film effective plane is pressed by the film holding unit. Therefore, frame shifts may not be prevented completely as in a conventional camera in which the film is fed by inserting the sprocket in the perforation.

SUMMARY OF THE INVENTION

An object of the present invention is to provide a camera in which a frame shift prevention member is inserted in the film perforation to prevent frame shifts all the time, without making the film feeding time longer or increasing battery power consumption.

The above objective is accomplished by providing a frame shift prevention member that normally positions itself in the film feeding path but withdraws from the film feeding path due to the film feeding force. A first oblique plane makes contact with the edge of the perforation when the film is fed in a first direction in which frame shifts occur more easily and a second oblique plane makes contact with the edge of the perforation when the film is fed in a second direction opposite from the first direction in which frame shifts occur less easily than in the first direction. The two oblique planes are formed on the frame shift prevention member. Among the two angles between the first oblique plane and the first direction, the first angle, and between the second oblique plane and the second direction the second angle, at least the first angle is defined to oppose the forces acting on the film due to external action and the second angle between the second oblique plane and the second direction is defined to be smaller than the first angle between the first oblique plane and the first direction.

The edge of the perforation and the clearance of the oblique plane are set smaller than the tolerance value of the frame shift, and if a movement force acts on the film due to vibrations or influences of the camera that occur repeatedly or with large magnitude, the edge of the perforation of the film makes contact with the first oblique plane. The angle of inclination of the first oblique plane SL1 is defined to be relatively large so that frame shifts do not occur with film motion due to external film motion forces beyond the tolerance value. Moreover, since the angle of inclination is smaller than the amount of feeding resistance that the perforation edge receives from the second inclination plane during the feeding of film into the cartridge is smaller than the feeding resistance that the perforation edge receives from the first inclination plane during the feeding of film in the first direction.

The camera according to the first embodiment of the present invention includes an arm unit that elastically supports the frame shift prevention member onto a pressure plate. In a second embodiment of the present invention, the frame shift prevention member and the pressure plate are integrated in one body as a one-piece unitary structure.

In the camera according to the third embodiment of the present invention, the frame shift prevention member is integrated to the camera as one body.

In the camera according to the fourth embodiment of the present invention, the frame shift prevention member includes a support unit and the frame shift prevention member is supported by the support unit that is capable of sliding in a support hole of the camera body. Additionally, an elastic body is provided between the frame shift prevention member and the camera body to bias the frame shift prevention member toward the film feeding path.

BRIEF DESCRIPTION OF THE DRAWINGS

The invention will be described with reference to the following drawings in which like reference numerals refer to like elements and wherein.

DETAILED DESCRIPTION OF PREFERRED EMBODIMENTS

Figure 1:
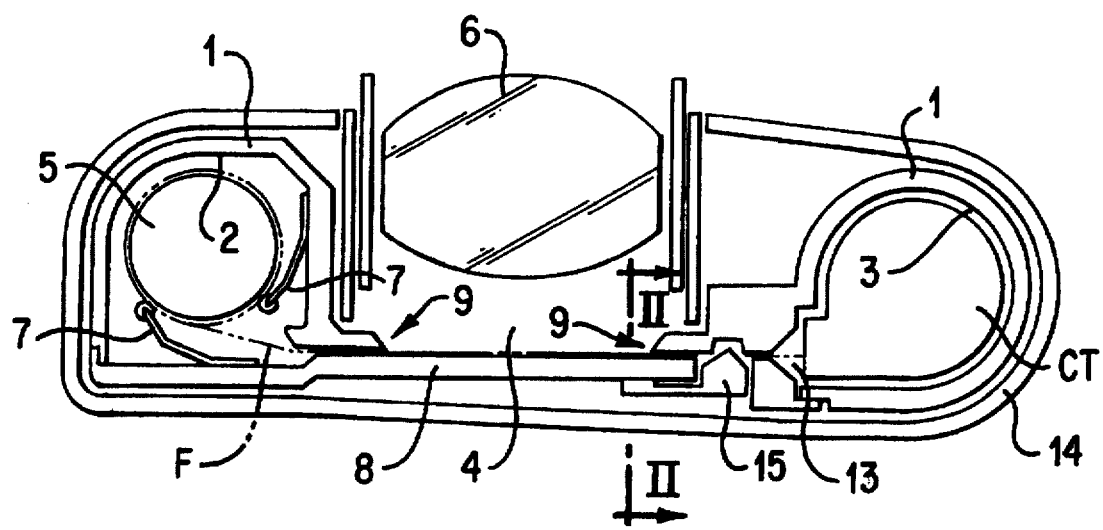
FIG. 1 is a cross-sectional view of the first embodiment of a camera with a frame shift prevention member of the present invention.

FIG. 1 is a cross section of a camera including the frame shift prevention member of the present invention. A camera body 1 includes a spool chamber 2 on the left of the camera body 1, a cartridge chamber 3 on the right, and a dark box 4 between the two chambers. In the spool chamber 2, the spool 5, which is free to rotate by means of an unrepresented driving device, is provided and a lens 6 is provided in front of the dark box 4. A film cartridge CT is mounted in the cartridge chamber 3. In addition, a film press 7 is provided in the spool chamber 2 to press the film F on the surface of the spool 5 as the film F wraps around the spool 5.

Figure 2:
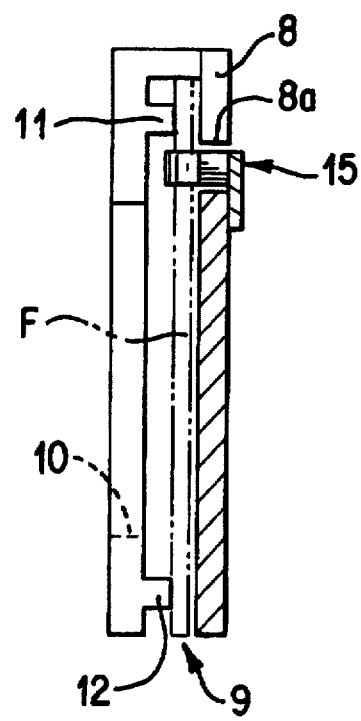
FIG. 2 is a cross-sectional view of the film feeding path viewed from the direction of line II—II of the camera of FIG. 1.

A pressure plate 8 is provided in the rear of the camera body and a film feeding path 9 is formed between the pressure plate 8 and the camera body 1. As shown in FIG. 2, an upper rail 11 and a lower rail 12 are provided in the side of the camera body parallel to the upper and lower edges of an aperture 10, and the film F runs through the path 9 formed between the upper and the lower rails 11, 12 and the pressure plate 8. In FIG. 1, the left edge of the pressure plate 8 is attached to one edge of the camera body that forms the spool chamber 2, creating part of the wall of the spool chamber 2. The right edge of the pressure plate 8 is attached to the camera body 1 that forms the cartridge chamber 3. A film entrance/exit path 13 is formed between the camera body 1 and the cartridge chamber 3. The film entrance/exit path 13 is tapered in the direction of film feeding and feeds the film F that is advanced from the cartridge CT smoothly to the film feeding path 9.

A cover 14 surrounds the camera body 1 and includes a cartridge opening that opens and shuts with a cartridge lid formed at the bottom.

Figure 3:
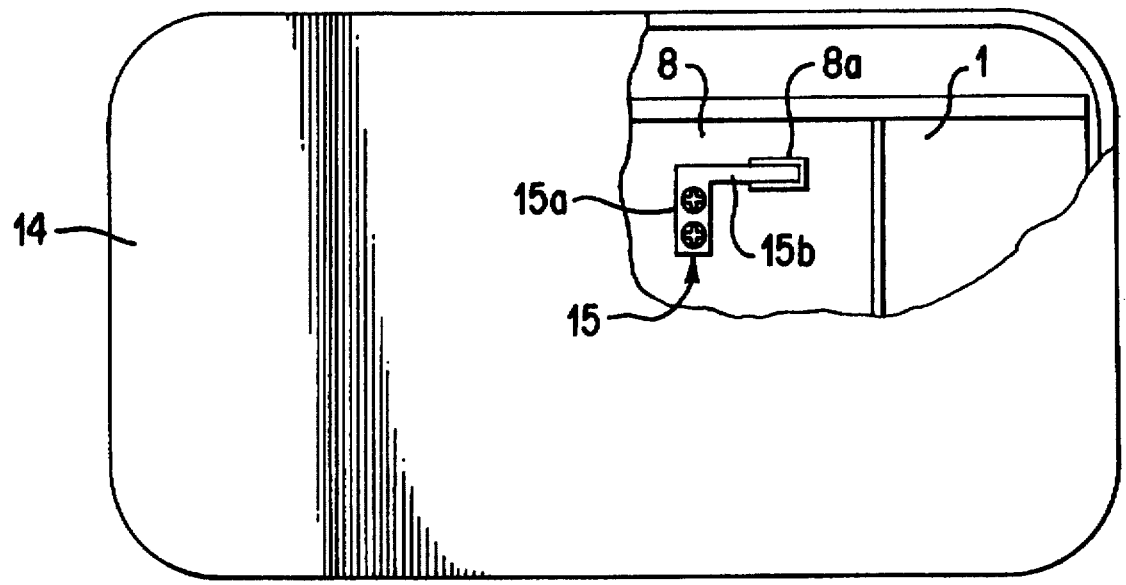
FIG. 3 is a partially cutaway rear view of the camera of FIG. 1.

In the pressure plate 8, a rectangle opening 8a is provided in a position facing the film perforation (FIGS. 2, 3). A frame shift prevention member 15 is anchored on the pressure plate 8 and includes, as clearly shown in FIG. 4, an installation base unit 15a, an arm 15b which extends from the installation base unit 15a, and an insertion unit 15c formed on the arm 15b with the installation base unit 15a anchored on the back surface of the pressure board 8 by a screw.

Figure 4:
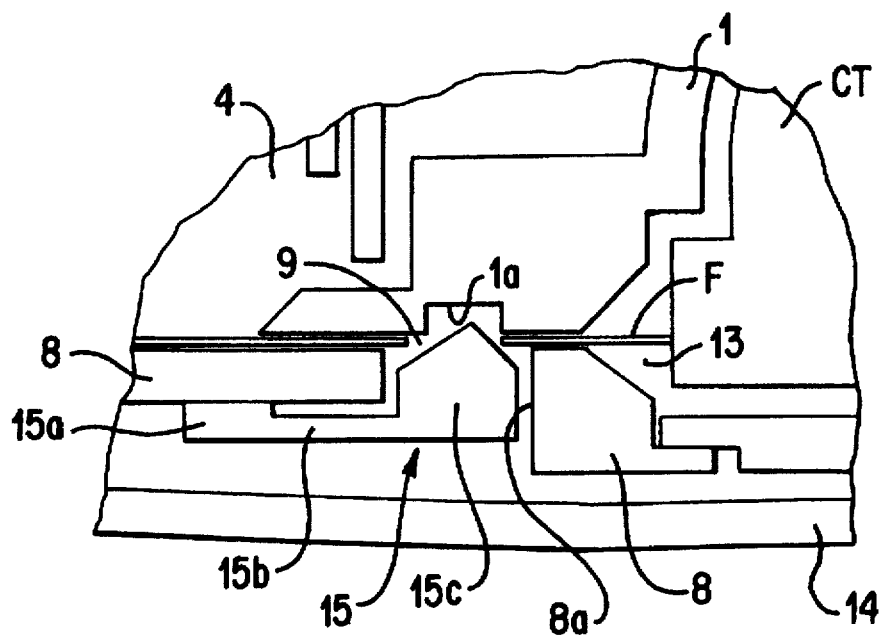
FIG. 4 is an enlarged view of the vicinity of the frame shift prevention member of the camera of FIG. 1.

The insertion unit 15c is inserted into the opening 8a with the tip extending across the film feeding path 9 to protrude into a concave section of the camera body located facing the opening 8a. The arm 15b is made of an elastic body that deforms in the directions of the front and the back of the camera, and the insert unit 15c is pushed back and caused to retreat toward the back of the camera from the film surface with the running of the film F. Hence, the insertion unit 15c does not interfere with the running of the film. When the perforation faces the insertion unit 15c due to feeding of the film, the insertion unit 15c returns to its original position by the elastic restoration power of the arm 15b and enters into the perforation as shown in FIG. 4.

Figure 5:
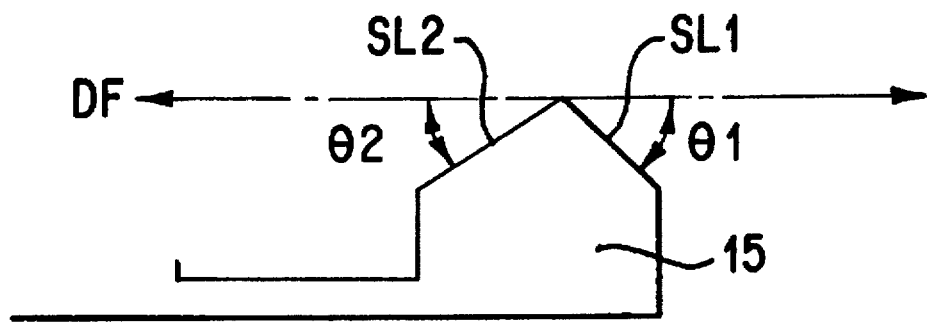
FIG. 5 is an enlarged view of the insertion unit of the frame shift prevention member of FIG. 4.

The insertion unit 15c presents an arrowhead-shaped cross section with a first oblique plane SL1 of the cartridge chamber side and a second oblique plane SL2 having different inclination angles, as shown in FIG. 5.

In the illustrated embodiments, it is assumed that the film feeding mechanism is such that frame shifts occur more easily in the first direction away from the film cartridge than in the second direction toward the film cartridge. The angle θ1 of the oblique plane SL1 from the direction of film feeding DF is set larger than the angle θ2 of the second oblique plane SL2 from the direction of film feeding DF. That is, the inclination of the first oblique plane SL1 that makes contact with the perforation edge during winding is made steeper than the inclination of the second oblique plane SL2 that makes contact with the perforation edge during rewinding for reasons explained in the following.

The film F is pressed against the spool 5 by the film press 7 as the film is being wound. Hence slack in the film immediately after shooting is assumed to be very small. Therefore, in order to move the film F sharply in the direction of rewinding by an external force, rotation of the spool 5 becomes necessary, but, because the spool 5 is connected to a film feeding driving device made of gears and the like, it becomes difficult for the external vibrations or other influences that the camera receives to cause it to rotate. On the other hand, in the direction of winding, various resistances for frame shifts exist such as resistance by the film press 7, resistance within the film feeding path 9, and resistance within the cartridge. Also, depending upon the conditions, frame shifts may occur due to external vibrations and other influences. Thus, in the illustrated embodiment, most of the frame shifts are assumed to occur in the direction of winding.

Because the insertion unit 15c of the frame shift prevention member 15 is made to have a rectangular shape like the film perforation, rather than an arrowhead shape, frame shifts in the direction of film feeding can be prevented completely as long as the insertion unit is inserted in the film perforation. However, with a rectangular shape frame shift prevention member, it is impossible to withdraw the insertion unit by film feeding power; hence, it becomes necessary to provide a mechanism that synchronizes with film feeding and causes the insertion unit to withdraw from the film feeding path 9. In order to avoid the need for such a withdrawal mechanism, the film feeding power should be used to withdraw the insertion unit. For this reason, the two faces opposing the spool chamber 2 and the cartridge chamber 3 are sloped.

With the provision of such an oblique plane in the insertion unit, it becomes possible to withdraw the insertion unit from the film feeding path 9 by the film feeding power, but film feeding resistance occurs. In order to reduce battery consumption power or to shorten the film feeding time, it is necessary to make the film feeding resistance small. Film feeding resistance varies with the angle of inclination of the oblique plane, and the smaller the angle of the oblique plane from the film feeding direction becomes, the smaller the resistance of film feeding becomes. A small film feeding resistance implies a small restraint against frame shifts. In designing an oblique plane, the angle of inclination is set to satisfy these conditions. As shown in the illustrated embodiment, in which the frame shifts occur more easily in the direction of film winding, the angle of inclination θ1 of the first oblique plane in the cartridge chamber 3 side is made larger than θ2. Hence, the film feeding resistance in the direction of winding, that is, the frame shift resistance, is made larger than the resistance in the rewinding direction.

Here, the shape of the arm unit 15b is defined in such a manner that the arm unit 15b deforms due to the force of the film that is being pushed in the front and the rear directions of the camera via the insertion unit 15c when film is advanced from the cartridge CT during film mounting, film winding, and film rewinding, respectively. At the same time, when a force acts on the oblique plane through the perforation edge due to the movement force of the film within the film feeding path 9 caused by vibrations or other influences from external forces acting on the camera, that is, when frame shifts are being prevented, the arm 15b is pushed back toward the rear of the camera. Therefore, the shape of the arm 15b is determined in such a manner that the insertion unit 15c does not come off the perforation due to force acting on the insertion unit in the directions of the front and the rear of the camera by the film movement force.

When the film moves in the direction of winding due to vibrations and influences on a camera thus structured, the perforation edge collides with the first oblique plane SL1 in the insertion unit 15c. Since the angle of inclination θ1 of the first oblique plane is greater than the angle of inclination θ2 of the second oblique surface SL2, the feeding resistance in the direction of film winding caused by the frame shift prevention member 15 is larger than the feeding resistance in the direction of rewinding. As described above, because the frame shift resistance in the direction of winding is smaller than the frame shift resistance in the direction of rewinding to begin with, the feeding resistance in the direction of winding by the frame shift prevention member is made larger than the feeding resistance in the direction of rewinding. Hence, undesired displacement of the film in the direction of winding is reliably prevented. Moreover, since displacement in the direction of rewinding is made more difficult, the inclination of the second oblique plane SL2 is made less to reduce battery power consumption and shorten the rewinding time.

Figure 6:
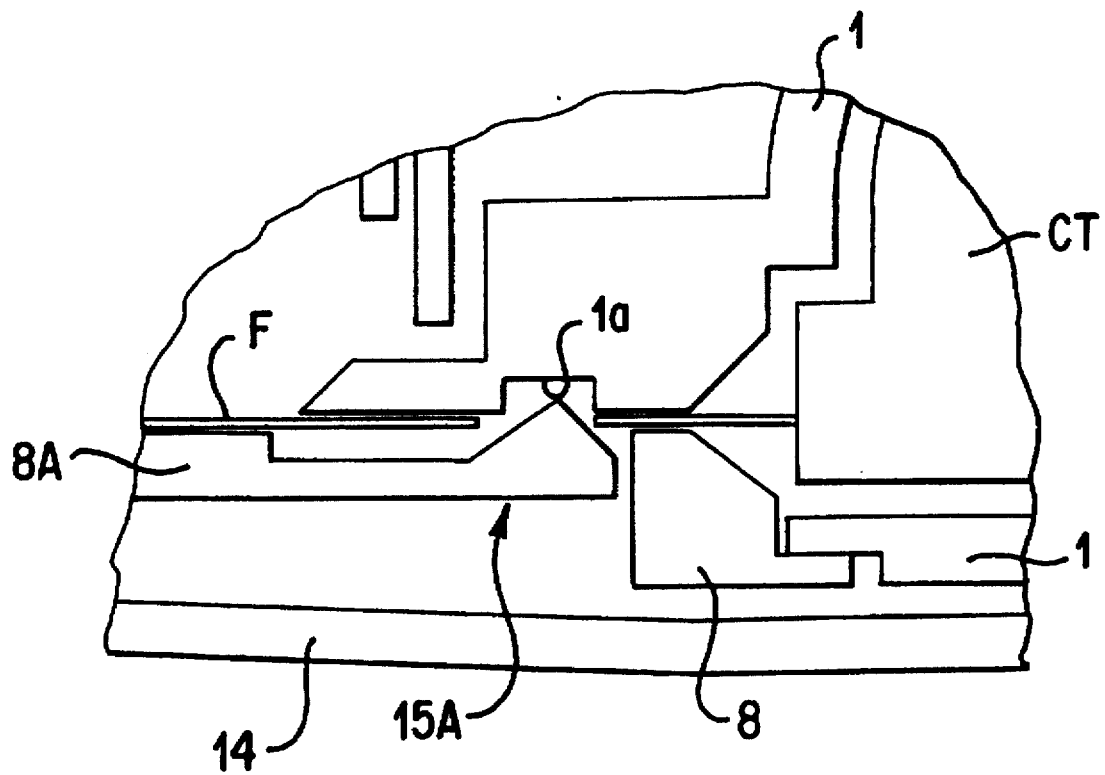
FIG. 6 is an enlarged view of the vicinity of the frame shift prevention member and the pressure plate integrated into one body in the second embodiment of a camera of the present invention.
Figure 7:
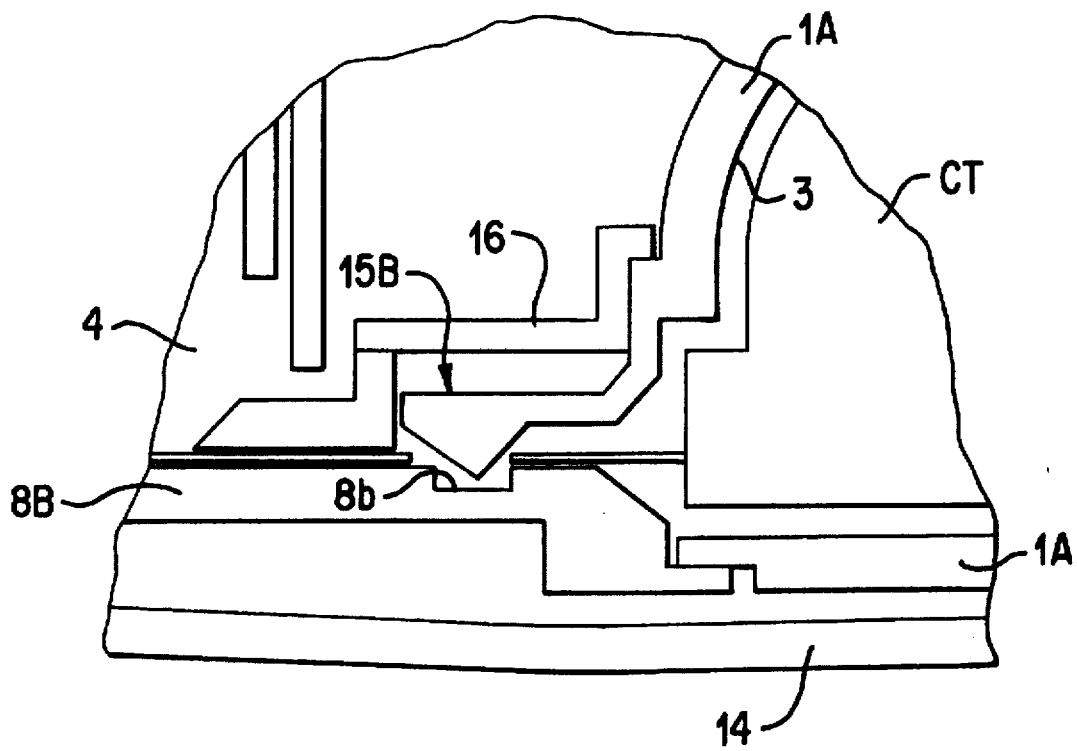
FIG. 7 is an enlarged view of the vicinity of the frame shift prevention member and the camera body integrated into one body in the third embodiment of a camera of the present invention.

In a second embodiment of the present invention, the frame shift prevention member 15A can be formed as one body with the pressure board 8A by injection molding resin as shown in FIG. 6. In a third embodiment of the present invention, the frame shift prevention member 15B is formed as one body with the camera body 1A as shown in FIG. 7. In this case, a concave section 8b is provided in the pressure board 8B. The opening 8a shown in FIG. 3 is unnecessary. Also, in this case, a shielding member 16 to shield the dark box 4 from the cartridge chamber 3 is provided.

Figure 8:
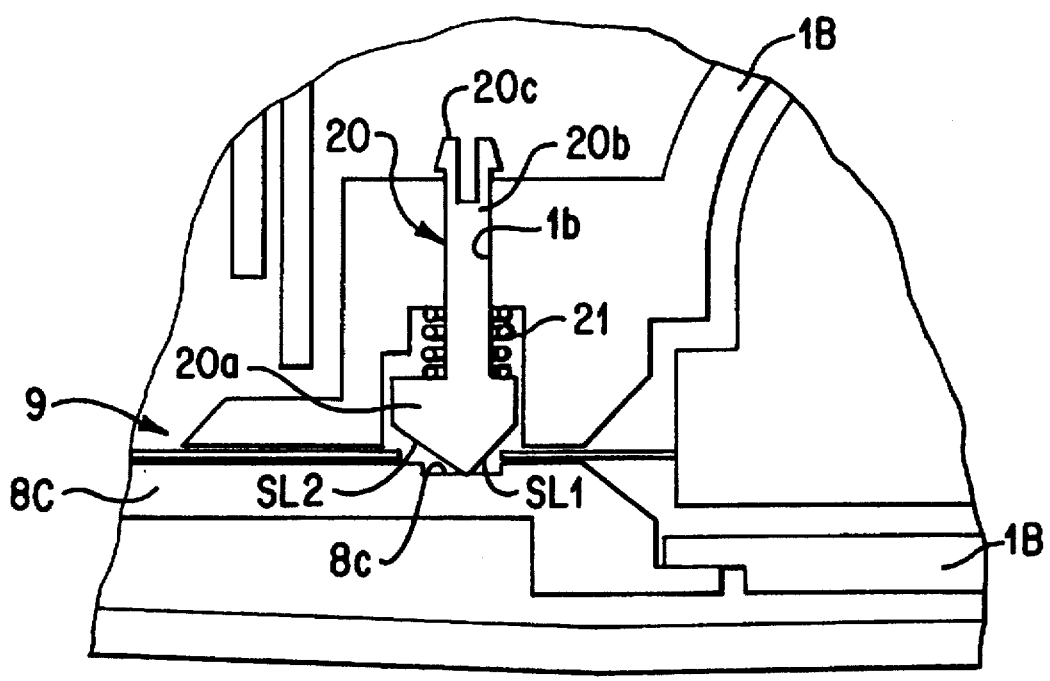
FIG. 8 is an enlarged view of the vicinity of the frame shift prevention member installed and free to slide in the camera body in the fourth embodiment of a camera of the present invention.

FIG. 8 shows a fourth embodiment of the present invention in which the frame shift prevention member 20 is supported, free to slide, by the camera body 1B. The frame shift prevention member 20 includes an insert unit 20a that moves toward and away from the perforation and a support unit 20b to support the insert unit 20a on the camera body 1B. In addition, the first and the second oblique planes SL1 and SL2, similar to the planes described in the embodiment of FIG. 5, are formed on the insert unit 20a. The support unit 20b of the frame shift prevention member 20 is inserted and joined to a sliding hole 1b of the camera body 1B to slide freely and is prevented from falling off of the camera body 1B by a stopper 20c. A compression spring 21 is placed between the camera body 1B and the insertion unit 20a, biasing the frame shift prevention unit 20 toward the film feeding path 9. A concave section 8c to store the frame shift prevention member 20 is provided in the pressure board 8c.

In the above embodiments, the cameras use a cartridge of the type that advances film from the cartridge chamber, but the present invention can be applied equally well to a camera of the type that draws film from the cartridge chamber by rotation of a spool, used, for example, with 135 film. Moreover, while the first and the second oblique planes were flat surfaces having uniform slopes, surfaces possessing curvature may also be used. In that case, the angles of inclination θ1 and θ2 are the angles made by tangents to an oblique surface on which the edge of the film perforation makes contact and the direction of film feeding, θ1 is defined to produce the desired frame shift resistance, and θ2 is defined so that the rewinding resistance becomes small.

As explained in detail above, with the present invention, a frame shift prevention member is inserted into the perforation to prevent displacement of the film, and, because the inclination of the first oblique plane to which the edge of perforation makes contact during film feeding away from the cartridge is made steeper than the inclination of the second oblique plane to which the edge of the perforation makes contact during feeding of the film into the cartridge, frame shifts in the direction of feeding film away from the cartridge are reliably prevented. At the same time, the feeding load in the direction of film feeding into the cartridge is lightened, resulting in a shortening of feeding time and a reduction of battery power consumption.

While this invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention as defined in the following claims.

What is claimed is:

1. A camera for film feeding of film stored in a cartridge and including perforations, said camera including a frame shift prevention function to prevent frame shifts caused by actions external to said camera, said camera comprising:

a frame shift prevention member movable from a first position in a film feeding path to a second position outside the film feeding path by forces applied to said prevention member by film feeding, wherein said prevention member includes a first oblique plane and a second oblique plane, said first oblique plane making contact with an edge of a film perforation when said film is fed in a first direction in which frame shifts occur more easily than in a second direction opposite to the first direction and said second oblique plane making contact with an edge of said film perforation when said film is fed in the second direction, said first oblique plane defining a first angle with said first direction so as to oppose film feeding due to said external actions and said second oblique plane defining a second angle with said second direction, said second angle being smaller than said first angle; and a pressure plate to maintain the flatness of said film and arm unit mounted on said pressure plate that elastically supports said prevention member.

2. The camera of claim 1, further comprising a camera body, wherein said prevention member includes a tip that extends into a concave section of said camera body when said prevention member is in said first position.

3. The camera of claim 1, further comprising a pressure plate to guide said film, wherein said prevention member includes a tip that extends into a concave section of said pressure plate when said prevention member is in said first position.

4. A camera for film feeding of film stored in a cartridge and including perforations, said camera including a frame shift prevention function to prevent frame shifts caused by actions external to said camera, said camera comprising:

a frame shift prevention member movable from a first position in a film feeding path to a second position outside the film feeding path by forces applied to said prevention member by film feeding, wherein said prevention member includes a first oblique plane and a second oblique plane, said first oblique plane making contact with an edge of a film perforation when said film is fed in a first direction in which frame shifts occur more easily than in a second direction opposite to the first direction and said second oblique plane making contact with an edge of said film perforation when said film is fed in the second direction, said first oblique plane defining a first angle with said first direction so as to oppose film feeding due to said external actions and said second oblique plane defining a second angle with said second direction, said second angle being smaller than said first angle; and a pressure plate to maintain the flatness of said film, wherein said pressure plate and said prevention member are formed as a one-piece unitary structure.

5. A camera for film feeding of film stored in a cartridge and including perforations, said camera including a frame shift prevention function to prevent frame shifts caused by actions external to said camera, said camera comprising:

a frame shift prevention member movable from a first position in a film feeding path to a second position outside the film feeding path by forces applied to said prevention member by film feeding, wherein said prevention member includes a first oblique plane and a second oblique plane, said first oblique plane making contact with an edge of a film perforation when said film is fed in a first direction in which frame shifts occur more easily than in a second direction opposite to the first direction and said second oblique plane making contact with an edge of said film perforation when said film is fed in the second direction, said first oblique plane defining a first angle with said first direction so as to oppose film feeding due to said external actions and said second oblique plane defining a second angle with said second direction, said second angle being smaller than said first angle; and a camera body, wherein said prevention member and said camera body are formed as a one-piece unitary structure.

6. A camera for film feeding of film stored in a cartridge and including perforations, said camera including a frame shift prevention function to prevent frame shifts caused by actions external to said camera, said camera comprising:

frame shift prevention means movable from a first position in a film feeding path to a second position outside the film feeding path by forces applied to said prevention member by film feeding, wherein, in said first position, said prevention means contacts an edge of a film perforation to prevent said frame shifts and provides greater film feeding resistance when the film is fed in a first direction than when the film is fed in a second direction opposite to the first direction; and pressure plate means for maintaining the flatness of said film and elastic support means mounted on said pressure plate means for elastically supporting said prevention means.

7. The camera of claim 6, further comprising a camera body, wherein said prevention means includes a tip means for extending into a concave section of said camera body when said prevention means is in said first position.

8. The camera of claim 6, further comprising pressure plate means for guiding said film, wherein said prevention means includes a tip that extends into a concave section of said pressure plate means when said prevention means is in said first position.

9. A camera for film feeding of film stored in a cartridge and including perforations, said camera including a frame shift prevention function to prevent frame shifts caused by actions external to said camera, said camera comprising:

frame shift prevention means movable from a first position in a film feeding path to a second position outside the film feeding path by forces applied to said prevention member by film feeding, wherein, in said first position, said prevention means contacts an edge of a film perforation to prevent said frame shifts and provides greater film feeding resistance when the film is fed in a first direction than when the film is fed in a second direction opposite to the first direction; and pressure plate means for maintaining the flatness of said film, wherein said pressure plate means and said prevention means are formed as a one-piece unitary structure.

10. A camera for film feeding of film stored in a cartridge and including perforations, said camera including a frame shift prevention function to prevent frame shifts caused by actions external to said camera, said camera comprising:

frame shift prevention means movable from a first position in a film feeding path to a second position outside the film feeding path by forces applied to said prevention member by film feeding, wherein, in said first position, said prevention means contacts an edge of a film perforation to prevent said frame shifts and provides greater film feeding resistance when the film is fed in a first direction than when the film is fed in a second direction opposite to the first direction; and a camera body, wherein said prevention means and said camera body are formed as a once-piece unitary structure.

11. A method of preventing frame shifting in a camera for film feeding of film stored in a cartridge and including perforations, said method preventing frame shifts caused by actions external to said camera, comprising the steps of:

contacting an edge of a film perforation in the film feeding path with a prevention member to prevent frame shifts;

providing a greater film feeding resistance when the film is fed in a first direction than when the film is fed in a second direction opposite to the first direction;

feeding said film so that said film moves said prevention member from contact with said edge to a position outside the film feeding path by forces applied to said prevention member by feeding said film; and forming said prevention member and a pressure plate for maintaining the flatness of said film as a one-piece unitary structure.

12. The method of claim 11, further comprising the step of extending a tip of said prevention member into a concave section of said camera body when said prevention means is in the film feeding path.

13. A method of preventing frame shifting in a camera for film feeding of film stored in a cartridge and including perforations, said method preventing frame shifts caused by actions external to said camera, comprising the steps of:

contacting an edge of a film perforation in the film feeding path with a prevention member to prevent frame shifts;

providing a greater film feeding resistance when the film is fed in a first direction than when the film is fed in a second direction opposite to the first direction;

feeding said film so that said film moves said prevention member from contact with said edge to a position outside the film feeding path by forces applied to said prevention member by feeding said film; and forming a camera body and said prevention member as a one-piece unitary structure.

* * * * *